United States Patent
Jain et al.

(10) Patent No.: US 9,779,140 B2
(45) Date of Patent: Oct. 3, 2017

(54) RANKING SIGNALS FOR SPARSE CORPORA

(71) Applicant: Google Inc., Mountain View, CA (US)

(72) Inventors: Ankit Jain, Milpitas, CA (US); Abhinav Khandelwal, Maharashtra (IN)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 13/679,015

(22) Filed: Nov. 16, 2012

(65) Prior Publication Data

US 2014/0143222 A1  May 22, 2014

(51) Int. Cl.
G06F 17/30 (2006.01)

(52) U.S. Cl.
CPC .... *G06F 17/3053* (2013.01); *G06F 17/30646* (2013.01); *G06F 17/30864* (2013.01)

(58) Field of Classification Search
USPC .................................................. 707/706–750
See application file for complete search history.

(56) References Cited

U.S. PATENT DOCUMENTS

| | | | |
|---|---|---|---|
| 5,974,412 A * | 10/1999 | Hazlehurst et al. | |
| 6,640,218 B1 * | 10/2003 | Golding et al. | |
| 7,499,919 B2 * | 3/2009 | Meyerzon et al. | |
| 7,664,744 B2 | 2/2010 | Guha | |
| 7,685,119 B2 | 3/2010 | Riise et al. | |
| 7,783,644 B1 * | 8/2010 | Petrou et al. | 707/748 |
| 7,805,434 B2 * | 9/2010 | Alcorn | G06F 17/30312 707/649 |
| 7,908,184 B2 * | 3/2011 | Choe | G06Q 30/00 705/26.7 |
| 8,095,545 B2 * | 1/2012 | Telloli et al. | 707/750 |
| 8,095,582 B2 | 1/2012 | Cramer | |
| 8,122,013 B1 | 2/2012 | Qian et al. | |
| 8,301,616 B2 * | 10/2012 | Guha | G06F 17/30873 707/708 |
| 8,359,309 B1 * | 1/2013 | Provine et al. | 707/721 |
| 8,484,199 B1 * | 7/2013 | Katragadda et al. | 707/723 |

(Continued)

FOREIGN PATENT DOCUMENTS

EP 2228739 9/2010

OTHER PUBLICATIONS

ISR and Written Opinion of PCT/US2013/069097 mailed May 26, 2014.

*Primary Examiner* — Hanh Thai
(74) *Attorney, Agent, or Firm* — Morris & Kamlay LLP

(57) ABSTRACT

A method for retrieving information includes receiving a search query within an information corpus. Search results for the search query may be identified. A score for each of a plurality of data items identified in the search results may be generated. The score for a corresponding one of the plurality of data items may be based on a score dependent on the search query within the information corpus. The score may be also based on at least one score independent of the search query. The at least one score independent of the search query may include a ranking signal associated with a World Wide Web (WWW) search of the corresponding one of the plurality of data items using a second information corpus. The search results may be ranked based on the generated score.

18 Claims, 6 Drawing Sheets

(56) References Cited

U.S. PATENT DOCUMENTS

| | | | |
|---|---|---|---|
| 8,615,514 B1* | 12/2013 | Fernandes et al. | 707/728 |
| 8,645,390 B1* | 2/2014 | Oztekin et al. | 707/748 |
| 8,745,041 B1* | 6/2014 | Katragadda et al. | 707/723 |
| 9,116,918 B1* | 8/2015 | Kim | G06F 17/30241 |
| 2003/0033299 A1* | 2/2003 | Sundaresan | 707/5 |
| 2004/0107821 A1* | 6/2004 | Alcalde | G06F 17/30743 84/608 |
| 2006/0064411 A1 | 3/2006 | Gross et al. | |
| 2006/0083119 A1 | 4/2006 | Hayes et al. | |
| 2006/0254411 A1* | 11/2006 | Alcalde | G06F 17/30743 84/608 |
| 2007/0033168 A1* | 2/2007 | Minogue et al. | 707/3 |
| 2007/0156669 A1* | 7/2007 | Marchisio | G06F 17/30731 |
| 2007/0271235 A1* | 11/2007 | Frank et al. | 707/3 |
| 2007/0271246 A1* | 11/2007 | Repasi et al. | 707/3 |
| 2008/0133482 A1* | 6/2008 | Anick | G06F 17/30696 |
| 2009/0055385 A1 | 2/2009 | Jeon et al. | |
| 2009/0287697 A1* | 11/2009 | Minogue et al. | 707/5 |
| 2010/0031366 A1* | 2/2010 | Knight | G06Q 10/10 726/26 |
| 2010/0094853 A1* | 4/2010 | Telloli et al. | 707/706 |
| 2010/0235351 A1* | 9/2010 | Iwasa | G06F 17/30038 707/723 |
| 2010/0250524 A1* | 9/2010 | Hu | G06F 17/30675 707/723 |
| 2011/0055238 A1* | 3/2011 | Slaney et al. | 707/759 |
| 2011/0196855 A1* | 8/2011 | Wable et al. | 707/711 |
| 2011/0213770 A1* | 9/2011 | Minogue et al. | 707/723 |
| 2011/0282739 A1* | 11/2011 | Mashinsky et al. | 705/14.53 |
| 2011/0289095 A1* | 11/2011 | Minogue et al. | 707/748 |
| 2012/0036123 A1* | 2/2012 | Hasan | G06F 17/30386 707/723 |
| 2012/0089598 A1* | 4/2012 | Oztekin et al. | 707/723 |
| 2012/0130996 A1* | 5/2012 | Risvik et al. | 707/723 |
| 2012/0221566 A1* | 8/2012 | Iwasa | G06F 17/30038 707/731 |
| 2012/0259844 A1* | 10/2012 | Yuan | G06F 17/30864 707/723 |
| 2014/0122465 A1* | 5/2014 | Bilinski | G06F 17/30761 707/723 |

\* cited by examiner

RANKING SIGNALS FOR SPARSE CORPORA

TECHNICAL FIELD

Aspects of the present application relate generally to the field of online information retrieval. More specifically, certain implementations of the present disclosure relate to using World Wide Web (WWW) data to create ranking signals for sparse non-web corpora.

BACKGROUND

An information retrieval system uses terms and phrases to index, retrieve, organize and describe documents. When a user enters a search query, the terms in the query are identified and used to retrieve documents from the information retrieval system, and then rank them. However, in sparse information retrieval systems, such as music search engines, there is often not enough data per document to distinguish documents from each other. Consequently, searches in such sparse information retrieval systems may result in ambiguous scoring of the documents associated with the search terms and phrases, which leads to non-optimal ranking of the search results.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for using World Wide Web (WWW) data to create ranking signals for sparse non-web corpora, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method for retrieving information may include receiving a search query within a non-web based information corpus. The non-web based corpus may include documents representing any kind of content, products and/or information. Examples of such documents may include movies (for a movie search engine), tracks/albums/artists (for a music search engine), books (for a books search engine), and other multimedia documents.

Search results for the search query may be identified. A score for each of a plurality of data items identified in the search results may be generated. The score for a corresponding one of the plurality of data items may be based on a score dependent on the search query within the non-web based information corpus. The score may be also based on at least one score independent of the search query. The at least one score independent of the search query may include a ranking signal associated with a World Wide Web (WWW) search of the corresponding one of the plurality of data items (e.g., by performing a search of the web-based information corpus). The search results may be ranked based on the generated score.

People do a large number of queries on web search engines every day. Based on the methods and systems described herein, the data collected from such search engines may be used to improve non-web search engines. We refer to such systems as the web corpus or the web-based information corpus.

In accordance with another example embodiment of the disclosure, a system for retrieving information may include a network device (e.g., the search engine 102, with a CPU 103 and memory 105, as illustrated in FIG. 1A). The network device may be operable to receive a search query within a non-web-based information corpus. Search results for the search query may be identified. A score for each of a plurality of data items identified in the search results may be generated. The score for a corresponding one of the plurality of data items may be based on a score dependent on the search query within the non-web based information corpus. The score may be also based on at least one score independent of the search query, the at least one score independent of the search query may include a ranking signal associated with a World Wide Web (WWW) search of the corresponding one of the plurality of data items (e.g., by performing a search of the web-based information corpus). The network device may be operable to rank the search results based on the generated score.

In accordance with yet another example embodiment of the disclosure, a non-transitory, machine-readable storage medium, having stored thereon a computer program having at least one code section for retrieving information may be disclosed. The at least one code section may be executable by a machine for causing the machine to perform a method including receiving a search query within a non-web based information corpus. Search results for the search query may be identified. A score for each of a plurality of data items identified in the search results may be generated. The score for a corresponding one of the plurality of data items may be based on a score dependent on the search query within the non-web based information corpus. The score may be also based at least one score independent of the search query. The at least one score independent of the search query may include a ranking signal associated with a World Wide Web (WWW) search of the corresponding one of the plurality of data items (e.g., by performing a search of the web-based information corpus). The search results may be ranked based on the generated score for each of the plurality of data items.

DETAILED DESCRIPTION

Figure 1A:
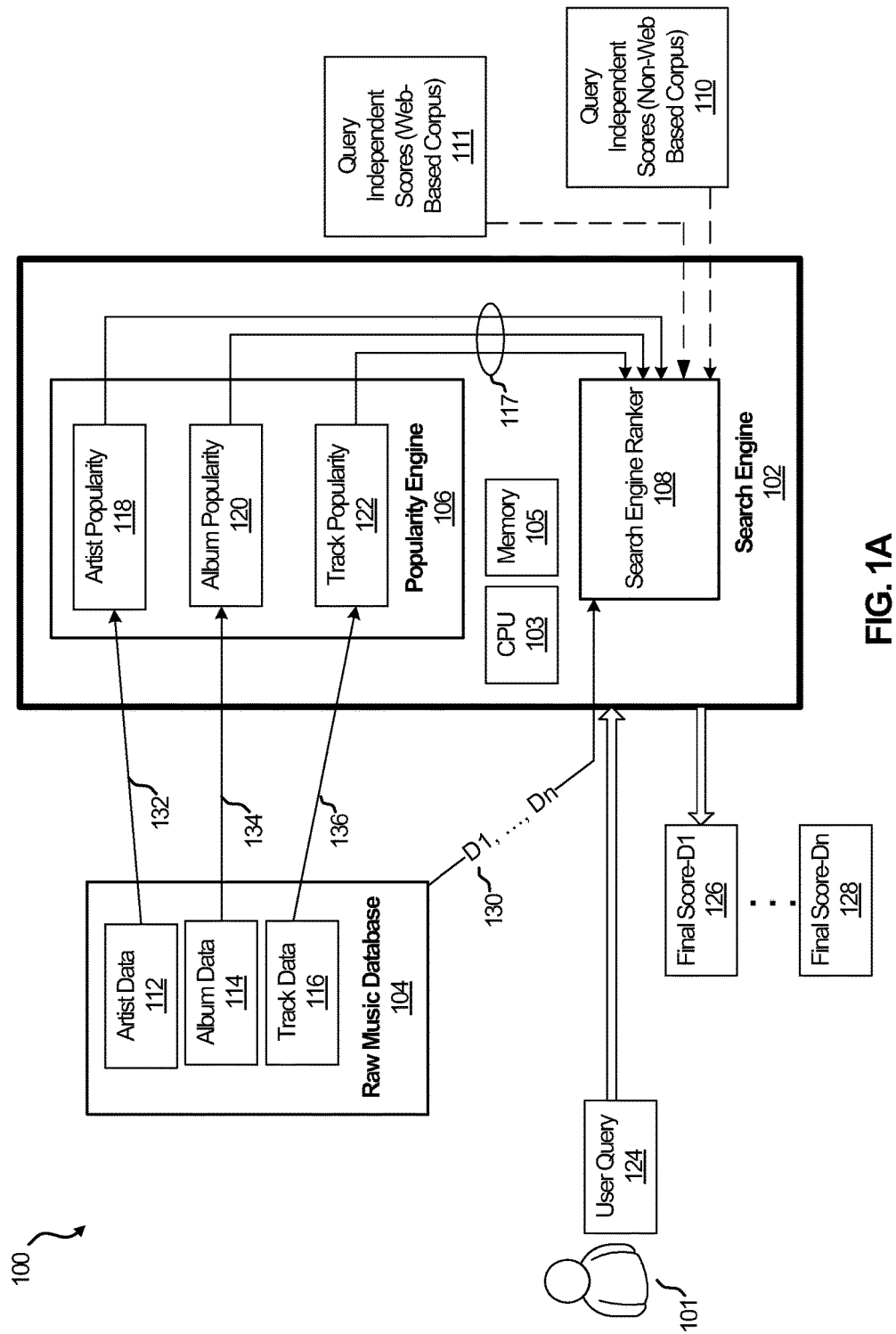
FIG. 1A is a block diagram illustrating an example information retrieval system, in accordance with an embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "e.g.," introduces a list of one or more non-limiting examples, instances, or illustrations. As used herein, the term "corpus" (plural, "corpora") means a collection of documents (or data items) of a given type. As used herein, the term "WWW-based search corpus" or "WWW-based corpus" is a corpus meant to include all documents available on the Internet (i.e., including, but not limited to, music-related documents, book-related documents, movie-related documents and other media-related documents). The term "non-WWW corpus" or "non WWW-based corpus" means a corpus where the corpus documents (or data items) are not available on the WWW. A non-WWW corpus is often referred to as a sparse corpus.

The term "non-overlapping corpus" (e.g., a first corpus is non-overlapping with a second corpus), means that documents that may be found in one corpus, may not be found in the other corpus (for example, a WWW-based corpus is non-overlapping with a non WWW-based corpus).

The present disclosure relates to a method and system for using World Wide Web (WWW) data to create ranking signals for sparse non-web corpora. In various implementations, a user search query may be received in a sparse information retrieval system, such as a music search engine. Since there may be limited data available in certain search categories (e.g., artists, albums, and tracks), seemingly similar documents from one category may be further distinguished from each other (and ranked), by using WWW data, such as related query popularity as well as the properties and signals of web page results when the query is performed in a WWW-based corpus (which is a query-independent signal). For example, treating the titles of data items (e.g., titles of movies, books, tracks, albums and/or artists, or some combination thereof), as web queries, the signals of the web pages resulting from such queries may be used as popularity signals associated with the corresponding titles of movies, books, tracks, albums and/or artists. Such popularity signals are query-independent signals since they do not depend on the original user query in the sparse non-web corpora. Additionally, signals from web page results that contain items related to the searched data item may be weighted more than other web page results.

For example, a method for retrieving information may include receiving a search query within a non-web based information corpus. Search results for the search query may be identified. A score for each of a plurality of data items identified in the search results may be generated. The score for a corresponding one of the plurality of data items may be based on a score dependent on the search query within the non-web based information corpus. The score may be also based on at least one score independent of the search query. The at least one score independent of the search query may include at least one ranking signal associated with a World Wide Web (WWW) search of the corresponding one of the plurality of data items (e.g., by performing a search of the web-based information corpus). The search results may be ranked based on the generated score.

The at least one ranking signal may include a first score signal based on one or both of query volume and query frequency of a search performed within the web-based information corpus for the corresponding one of the plurality of data items. The at least one ranking signal may include a second score signal based on at least one popularity metric for at least one web page search result of the search performed within the web-based information corpus for the corresponding one of the plurality of data items. The at least one popularity metric for a given data item may be based on one or both of a total number of search queries for the data item, as well as at least one of query-to-click ratio information and clickthrough ratio (CTR) information for the at least one web page search result for the data item.

FIG. 1A is a block diagram illustrating an example information retrieval system, in accordance with an embodiment of the disclosure. Referring to FIG. 1A, the example information retrieval system 100 may comprise a search engine 102 and a raw music database 104.

The raw music database 104 may comprise suitable circuitry, logic and/or code and may be operable to provide raw music-related data to the search engine 102. The raw music database 104 may comprise artist data module 112, album data module 114, and track data module 116. The artist data module 112 may comprise suitable circuitry, logic and/or code and may be operable to provide raw data about music artists (e.g., identification and biographic data). The album data module 114 may comprise suitable circuitry, logic and/or code and may be operable to provide raw data about music albums (e.g., album identification information, release date, etc.). The track data module 116 may comprise suitable circuitry, logic and/or code and may be operable to provide raw data about music tracks within a given album (e.g., number of tracks in an album, track names, track duration, etc.).

The search engine 102 may comprise suitable circuitry, logic and/or code and may be operable to receive raw music-related data (e.g., documents 130, D1, . . . , Dn) in response to user query 124 from user 101, and rank the received documents 130 based on the document final scores 126, . . . , 128. The search engine 102 may comprise a CPU 103, a memory 105, a popularity engine 106 and a search engine ranker 108.

The popularity engine 106 may comprise suitable circuitry, logic and/or code and may be operable to calculate a query-independent popularity score 117 for one or more categories of documents received from the raw music database 104. More specifically, the popularity engine 106 may comprise an artist popularity module 118, an album popularity module 120, and a track popularity module 122.

The track popularity module 122 may comprise suitable circuitry, logic and/or code and may be operable to receive music track-related data from the track data module 116 via the communication link 136. The track popularity module 122 may then calculate a query-independent popularity score for a given track. For example, the query-independent track popularity score may be based on the number of search queries previously received within the information retrieval system 100 about the specific music track.

The album popularity module 120 may comprise suitable circuitry, logic and/or code and may be operable to receive album-related data from the album data module 114 via the communication link 134. The album popularity module 120 may then calculate a query-independent popularity score for a given album. The query-independent popularity score for an album may be based on the number of search queries previously received within the information retrieval system 100 about the specific music album.

The artist popularity module 118 may comprise suitable circuitry, logic and/or code and may be operable to receive artist-related data from the artist data module 112 via the communication link 132. The artist popularity module 118 may then calculate a query-independent popularity score for a given artist. The query-independent popularity score for an artist may be based on the number of search queries previously received within the information retrieval system 100 (or within a World Wide Web-based information corpus) about the specific music artist, as well as at least one of query-to-click ratio information and clickthrough ratio (CTR) information for the at least one web page search result for the music artist. In this regard, the query-independent popularity score 117 may be one or more of a query-independent track popularity score, a query-dependent album popularity score, and a query-independent artist popularity score.

Even though the popularity engine 106 is illustrated as implemented within the search engine 102, the present disclosure may not be limited in this regard. More specifically, the popularity engine 106 may be implemented separately from the search engine 102.

The search engine ranker 108 may comprise suitable circuitry, logic and/or code and may be operable to receive one or more documents 130 (e.g., documents D1, ..., Dn) in response to a user query 124. The search engine ranker 108 may then rank the received documents 130 based on a final ranking score 126, ..., 128 calculated for each document using one or more popularity scores received from the popularity engine 106. The search engine ranker may generate the final ranking score 126, ..., 128 for each document based on the query-dependent score, as well as query-independent and popularity scores received from the query-independent score modules 110 and 111.

In accordance with an example embodiment of the disclosure, the information retrieval system 100 may also comprise query-independent scores modules 110 and 111. The query-independent scores module 110 may comprise suitable circuitry, logic and/or code and may be used to communicate one or more query-independent scores for a given document, where the query-independent score may be based on signals received from the sparse non-web corpus (e.g., the raw music database). The query-independent scores module 111 may comprise suitable circuitry, logic and/or code and may be used to communicate one or more query-independent scores for a given document, where the query-independent score may be based on WWW signals received from a web-based corpus (e.g., using a WWW search engine). The query-independent scores received from the query-independent scores modules 110-111 may be used by the search engine ranker 108 to generate the final ranking scores 126, ..., 128 of documents D1, ..., Dn.

In operation, a user 101 may send a user query 124 to the search engine 102. The user query 124 may be, for example, a query about a music track, a music album, or a music artist. After the search engine 102 receives the user query 124, the search engine 102 may obtain one or more documents 130 (D1, ..., Dn) that satisfy the user query 124.

For example, if the user query 124 is a query about a music track, the raw music database 104 may use track data module 116 and communicate track-related documents 130, which satisfy the user query 124 (e.g., if the query is about a specific song title, the returned documents 130 may be information on songs with the same title but taken from various albums and/or music artists). After the search engine 102 receives the documents 130, a query-independent popularity score 117 may be calculated for each of the documents, and the popularity score may be used by the ranker 108 to calculate the final ranking scores 126, ..., 128 for the documents and output a ranked search results list to the user 101. Additionally, other query-independent scores generated by modules 110-111 may also be used by the ranker 108 to calculate the final ranking scores 126, ..., 128 for the documents. More detailed explanation of calculating the popularity scores for artist-, album-, or track-related searches is provided herein below in reference to FIGS. 2-4.

Even though the search engine 102, the raw music database 104 and the query-independent scores modules 110-111 are all illustrated as separate blocks, the present disclosure may not be limited in this regard. More specifically, the raw music database 104 and the query-independent scores modules 110-111 may be part of, and implemented within, the search engine 102 with all processing functionalities being controlled by the CPU 103. The CPU 103 may be operable to perform one or more of the processing functionalities associated with retrieving of information, as disclosed herein.

Additionally, even though the sparse information retrieval system 100 is implemented as music-related information retrieval system (e.g., the search engine 102 is a music search engine), other types of information retrieval systems may also be implemented in similar fashion (e.g., a movie search engine and a books search engine, to name a few). In accordance with an example embodiment of the disclosure, the database 104 may be books- (or printed media-) related database (or any other type of media-related database). The search engine 102 may then use a popularity engine 106 to calculate query-independent popularity scores (as well as other query-independent scores received from modules 110-111) and rank various categories of documents available from the raw database 104, in response to a user search query 124. Furthermore, the information retrieval system 100 (including the search engine 102 may be implemented) in one or more network devices.

Figure 1B:
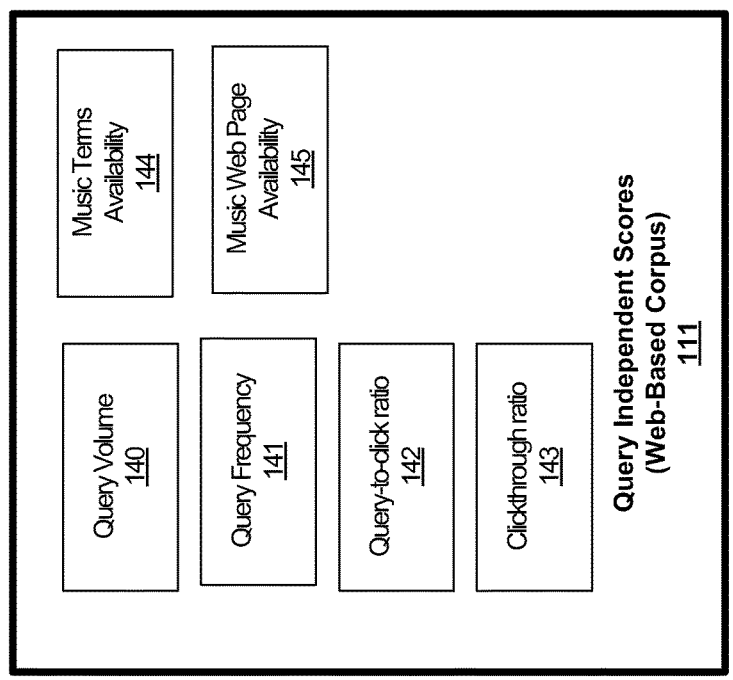
FIG. 1B is a block diagram of an example implementation of a query-independent scores module using WWW signals, in accordance with an example embodiment of the disclosure.

FIG. 1B is a block diagram of an example implementation of a query-independent scores module using WWW signals, in accordance with an example embodiment of the disclosure. Referring to FIG. 1B, the query-independent scores module 111 may comprise suitable circuitry, logic and/or code and may be used to communicate one or more query-independent scores for a given document, where the scores may be based on WWW signals for search results in a WWW-based corpus. The query-independent scores may be used by the search engine ranker 108 to generate the final ranking scores 126, ..., 128 of documents D1, ..., Dn. More specifically, the query-independent scores module 111 may comprise a query volume module 140, a query frequency module 141, a query-to-click ratio module 142, a clickthrough ratio module 143, a music terms availability module 144, and a music web page availability module 145.

The query volume module 140 and the query frequency module 141 may comprise suitable circuitry, logic and/or code and may be operable to provide scores associated with query volume and query frequency, respectively, of searches performed within a web-based information corpus. The query-to-click ratio module 142 and the click-through ratio module 143 may comprise suitable circuitry, logic and/or code and may be operable to provide scores associated with query-to-click ratios and click-through ratios, respectively, of web page search results for queries performed within the web-based information corpus.

The music terms availability module 144 may comprise suitable circuitry, logic and/or code and may be operable to provide scores based on availability of music-related terms in web page search results for queries performed within the web-based information corpus. The music web page availability module 145 may comprise suitable circuitry, logic and/or code and may be operable to provide scores based on whether or not individual web page search results, for queries performed within the web-based information corpus, include music-related web pages. In this regard, scores provided by the music terms availability module 144 and the music web page availability module 145 may be used to provide additional weight for web-based search results, when individual pages in such search results contain music-related terms or when the individual pages are entirely music-related.

Even though only six query-independent scores modules 150-153 (using web-based corpus signals) are listed with regard to the query-independent score module 111, the present disclosure is not limiting in this regard, and other query-independent scores may also be utilized by the search engine 102 in generating the final ranking scores 126, . . . , 128.

Figure 1C:
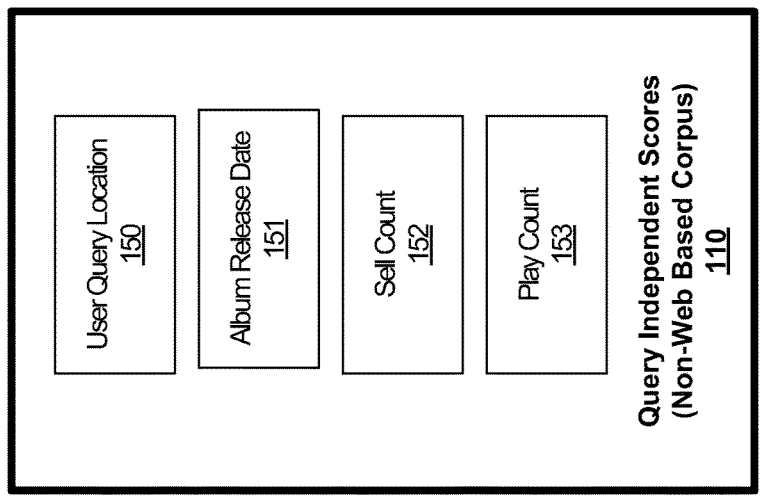
FIG. 1C is a block diagram of an example implementation of a query-independent scores module using non-web corpus signals, in accordance with an example embodiment of the disclosure.

FIG. 1C is a block diagram of an example implementation of a query-independent scores module using non-web corpus signals, in accordance with an example embodiment of the disclosure. Referring to FIG. 1C, the query-independent scores module 110 may comprise suitable circuitry, logic and/or code and may be used to communicate one or more query-independent scores for a given document, where the scores may be based on signals for search results in a non-web based corpus (e.g., a music search engine). The query-independent scores may be used by the search engine ranker 108 to generate the final ranking scores 126, . . . , 128 of documents D1, . . . , Dn. More specifically, the query-independent scores module 110 may comprise a user query location module 150, an album release data module 151, a sell count module 152, and a play count module 153.

Each of the modules 150-153 may comprise suitable circuitry, logic and/or code and may be operable to provide user query location information, album release data information, sell count information, or play count information, respectively, to the search engine ranker 108 for purposes of increasing the total ranking score of a given document. For example, if the user query 124 is about a specific music track by a given artist, the raw music database may locate and return back to the search engine 102 two tracks with the desired title and by the desired artist (e.g., the artist may have released the same song in 2 different languages, for two different geographic markets). The popularity scores returned by the popularity engine 106 may be the same for both tracks (the same album and the same artist may result in the same total popularity score after the album and artist popularity scores are compounded for each track). In this instance, the user query location module 150 may be used to communicate the geographic location of the user query 124 (e.g., the location may be obtained based on the IP address of the user 101 sending the search query 124). If the geographic location is the same as one of the two geographic markets intended by the two versions of the song, then the track recorded in the same language as the language of the geographic location the user query 124 was received from may be given an additional score and, therefore, ranked higher in the final ranking score list 126, . . . , 128.

Even though only four query-independent scores modules 150-153 (using non-web based corpus) are listed with regard to the query-independent score module 110, the present disclosure is not limiting in this regard, and other query-independent scores may also be utilized by the search engine 102 in generating the final ranking scores 126, . . . , 128.

Figure 2:
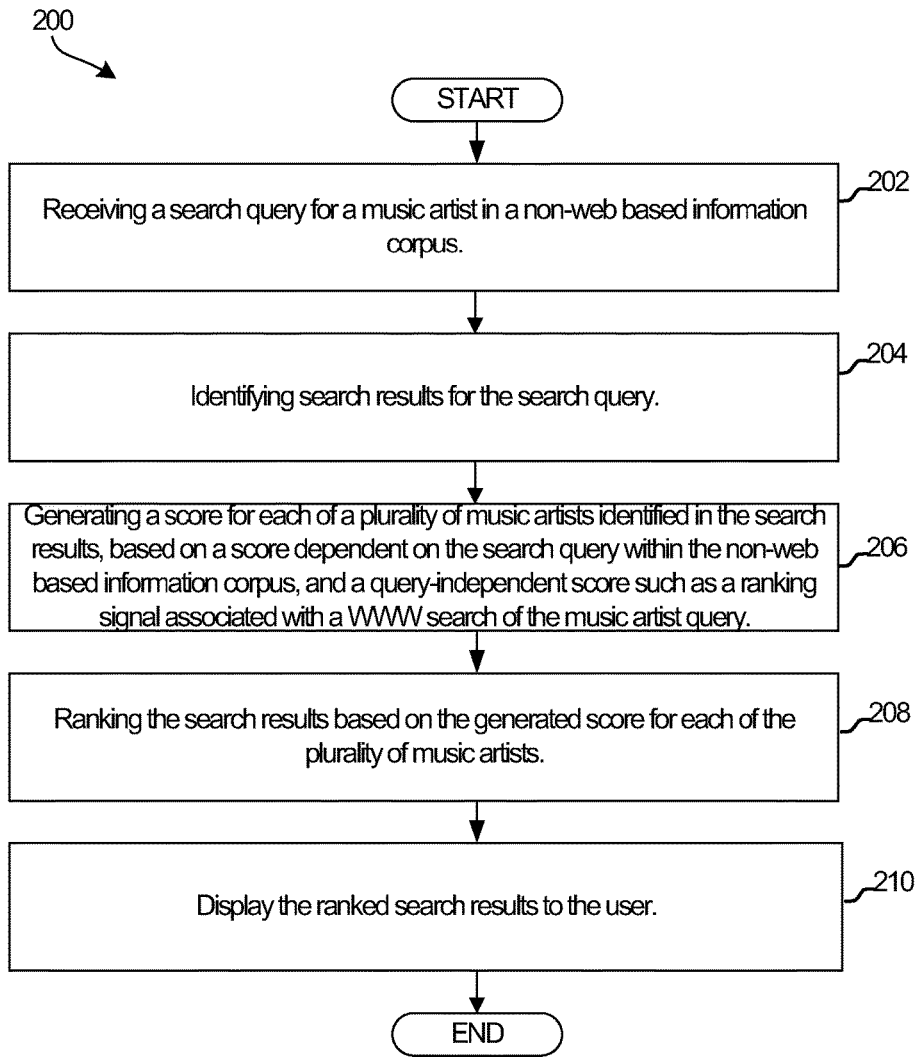
FIG. 2 is a flow chart illustrating example steps of a method for retrieving information in response to a search query for a music artist, in accordance with an example embodiment of the disclosure.

FIG. 2 is a flow chart illustrating example steps of a method for retrieving information in response to a search query for a music artist, in accordance with an example embodiment of the disclosure. Referring to FIGS. 1A-2, the example method 200 may start at 202 when the search engine 102 may receive a search query 124 for a music artist. At 204, the search engine 102 may use the raw music database 104 to identifying search results 130 for the search query. More specifically, artist-related data (e.g., documents D1, . . . , Dn) may be identified as the search results (using the artist data module 112) and communicated to the search engine ranker 108.

At 206, the search engine 102 may generate a ranking score (e.g., 126, . . . , 128) for each of a plurality of music artists identified in the search results (e.g., documents 130), based on a score dependent on the search query within the non-web based information corpus (e.g., the raw music database 104), and a query-independent score, such as a ranking signal associated with a WWW-based search of the music artist query.

Since the search query 124 is for a specific artist name, the returned search results (e.g., documents 130) may identify a plurality of different artists with the same (or similar) name as in the search query 124. For example, if the search query 124 is for "Janet Jackson", a plurality of artists named Janet Jackson may be identified in the search results. For each of the artists in the search results, the artist popularity module 118 within the popularity engine 106 may calculate a query-independent popularity score 117 for the corresponding artist, and may communicate the query-independent popularity score to the ranker 108. The query-independent popularity score for the artist may be based on the number of search queries previously received within the information retrieval system 100 (i.e., within the non-web based corpus) as well as at least one of query-to-click ratio information and clickthrough ratio (CTR) information for at least one web page search result for the artist.

Additionally, the ranker 108 may also receive query independent scores from one or both of the query independent scores modules 110-111. For example and in reference to the query independent scores module 111, the artist search query 124 may be used as input and a search query may be performed in a web-based corpus (or corpora). A plurality of web pages may be returned as results of the web-based search.

The query volume module 140 may calculate a score based on how many times the same artist search query 124 has been performed in the web-based corpus. The query frequency module 141 may calculate a score based on the frequency the artist search query 124 has been performed within the web-based corpus over a given period of time.

The query-to-click ratio module 142 may calculate scores for each of the web page results using query-to-click ratios associated with the individual web pages. Similarly, the click-through ratio module 143 may calculate scores for each of the web page results using click-through ratios associated with the individual web pages. Even though only two web page performance characteristics (e.g., query-to-click and click-through ratios) are used by the module 111, other performance characteristics may also be utilized to generate scores associated with search results within the web-based information corpus.

The query independent scores module 111 may further augment the score returned to the ranker 108 based on the content/genre of the individual web page results. For example, the music terms availability module 144 may detect if a given web page search result of the artist search query 124 contains music-related terms, and, if it does, the module 144 may weigh the query independent score more for such web page search result. Similarly, the music web page availability module 145 may detect if a given web page search result of the artist search query 124 is entirely music-related, and, if it is, the module 145 may weigh the query independent score more for such web page search result.

In addition to query-independent scores from the web-based corpus (provided by module 111), the ranker 108 may also receive and use query-independent scores from a non-web based corpus (provided by module 110, using search results from, e.g., queries in the raw music database 104) associated with the artist search query 124.

At 208, the search results 130 may be ranked based on the final ranking scores 126, . . . , 128 of the search results (e.g., documents D1, . . . , Dn) generated by the search engine 102. At 210, the ranked search results may be displayed to the user 101.

Figure 3:
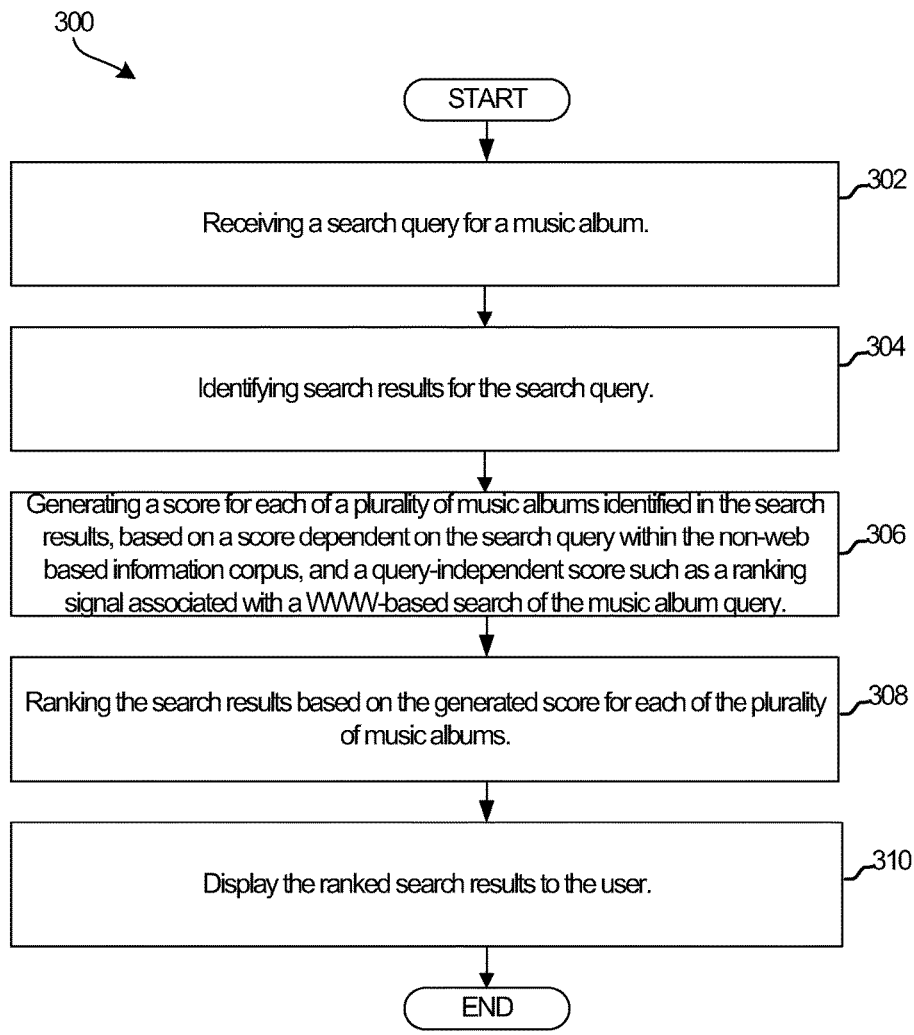
FIG. 3 is a flow chart illustrating example steps of a method for retrieving information in response to a search query for a music album, in accordance with an example embodiment of the disclosure.

FIG. 3 is a flow chart illustrating example steps of a method for retrieving information in response to a search query for a music album, in accordance with an example embodiment of the disclosure. Referring to FIGS. 1A-1C and 3, the example method 300 may start at 302 when the search engine 102 may receive a search query 124 for a music album. At 304, the search engine 102 may use the raw music database 104 to identify search results 130 for the search query. More specifically, album-related data (e.g., documents D1, . . . , Dn) may be identified as the search results (using the album data module 114) and communicated to the search engine ranker 108.

At 306, the search engine 102 may generate a ranking score (e.g., 126, . . . , 128) for each of a plurality of music albums identified in the search results (e.g., documents 130), based on a score dependent on the search query within the non-web based information corpus (e.g., the raw music database 104), and a query-independent score such as a ranking signal associated with a WWW-based search of the music album query.

Since the search query 124 is for a specific album name, the returned search results (e.g., documents 130) may identify a plurality of different albums with the same (or similar) name as in the search query 124. For each of the albums in the search results, the artist popularity module 120 within the popularity engine 106 may calculate a query-dependent popularity score 117 for the corresponding album, and may communicate the query-independent popularity score to the ranker 108. The query-independent popularity score for the album may be based on the number of search queries previously received within the information retrieval system 100 (i.e., within the non-web based corpus) as well as at least one of query-to-click ratio information and clickthrough ratio (CTR) information for at least one web page search result for the album.

Additionally, the ranker 108 may also receive query independent scores from one or both of the query independent scores modules 110-111. For example and in reference to the query independent scores module 111, the album search query 124 may be used as input and a search query may be performed in a web-based corpus (or corpora). A plurality of web pages may be returned as results of the web-based search.

The query volume module 140 may calculate a score based on how many times the same album search query 124 has been performed in the web-based corpus. The query frequency module 141 may calculate a score based on the frequency the album search query 124 has been performed within the web-based corpus over a given period of time.

The query-to-click ratio module 142 may calculate scores for each of the web page results using query-to-click ratios associated with the individual web pages. Similarly, the click-through ratio module 143 may calculate scores for each of the web page results using click-through ratios associated with the individual web pages.

The query independent scores module 111 may further augment the score returned to the ranker 108 based on the content/genre of the individual web page results. For example, the music terms availability module 144 may detect if a given web page search result of the artist search query 124 contains music-related terms, and, if it does, the module 144 may weigh the query independent score more for such web page search result. Similarly, the music web page availability module 145 may detect if a given web page search result of the album search query 124 is entirely music-related, and, if it is, the module 145 may weigh the query independent score more for such web page search result.

In addition to query-independent scores from the web-based corpus (provided by module 111), the ranker 108 may also receive and use query-independent scores from a non-web based corpus (provided by module 110, using search results from, e.g., queries in the raw music database 104) associated with the album search query 124.

At 308, the search results 130 may be ranked based on the final ranking scores 126, . . . , 128 of the search results (e.g., documents D1, . . . , Dn) generated by the search engine 102. At 310, the ranked search results may be displayed to the user 101.

Figure 4:
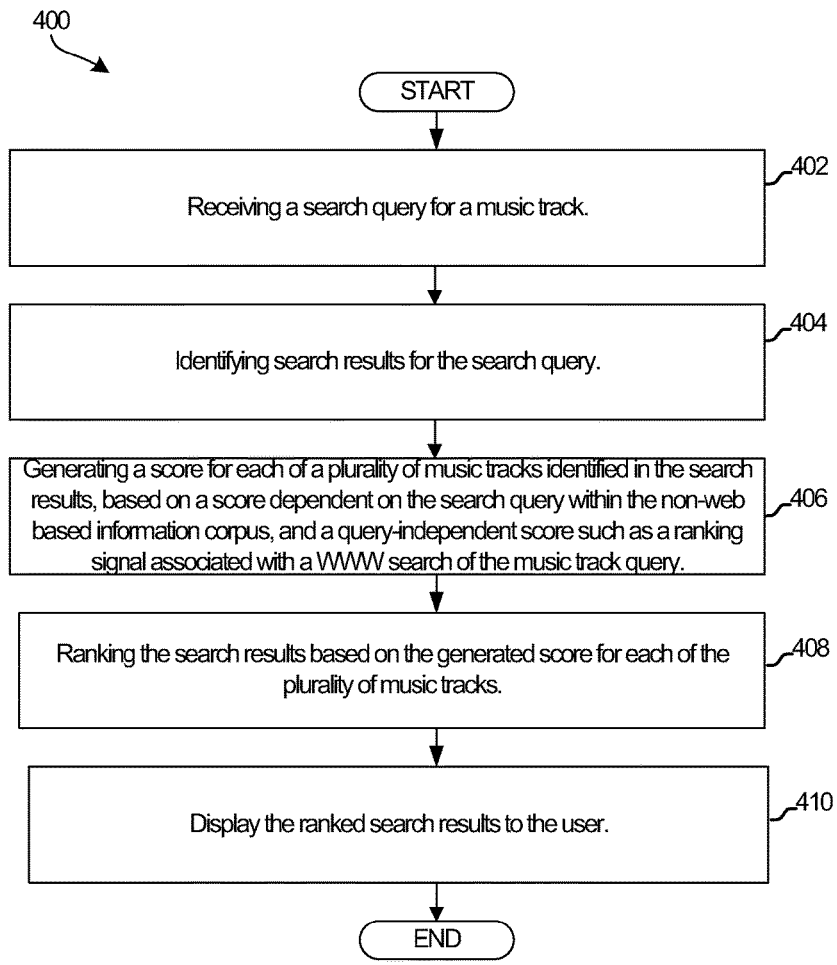
FIG. 4 is a flow chart illustrating example steps of a method for retrieving information in response to a search query for a music track, in accordance with an example embodiment of the disclosure.

FIG. 4 is a flow chart illustrating example steps of a method for retrieving information in response to a search query for a music track, in accordance with an example embodiment of the disclosure. Referring to FIGS. 1A-1C and 4, the example method 400 may start at 402 when the search engine 102 may receive a search query 124 for a music track. At 404, the search engine 102 may use the raw music database 104 to identifying search results for the search query 124. More specifically, track-related data (e.g., documents D1, . . . , Dn) may be identified as the search results (using the track data module 116) and communicated to the search engine ranker 108.

At 406, the search engine 102 may generate a ranking score (e.g., 126, . . . , 128) for each of a plurality of music albums identified in the search results (e.g., documents 130), based on a score dependent on the search query within the non-web based information corpus (e.g., the raw music database 104), and on a ranking signal associated with a WWW-based search of the music album query.

Since the search query 124 is for a specific track name, the returned search results (e.g., documents 130) may identify a plurality of different tracks with the same (or similar) name as in the search query 124. For each of the tracks in the search results, the track popularity module 122 within the popularity engine 106 may calculate a query-independent popularity score 117 for the corresponding track, and may communicate the query-independent popularity score to the ranker 108. The query-independent popularity score for the track may be based on the number of search queries previously received within the information retrieval system 100 (i.e., within the non-web based corpus) as well as at least one of query-to-click ratio information and clickthrough ratio (CTR) information for at least one web page search result for the track.

Additionally, the ranker 108 may also receive query independent scores from one or both of the query independent scores modules 110-111. For example and in reference to the query independent scores module 111, the track search query 124 may be used as input and a search query may be performed in a web-based corpus (or corpora). A plurality of web pages may be returned as results of the web-based search.

The query volume module 140 may calculate a score based on how many times the same track search query 124 has been performed in the web-based corpus. The query frequency module 141 may calculate a score based on the frequency the track search query 124 has been performed within the web-based corpus over a given period of time.

The query-to-click ratio module 142 may calculate scores for each of the web page results using query-to-click ratios associated with the individual web pages. Similarly, the clickthrough ratio module 143 may calculate scores for each of the web page results using clickthrough ratios associated with the individual web pages.

The query independent scores module 111 may further augment the score returned to the ranker 108 based on the content/genre of the individual web page results. For example, the music terms availability module 144 may detect if a given web page search result of the track search query 124 contains music-related terms, and, if it does, the module 144 may weigh the query independent score more for such web page search result. Similarly, the music web page availability module 145 may detect if a given web page search result of the track search query 124 is entirely music-related, and, if it is, the module 145 may weigh the query independent score more for such web page search result.

In addition to query-independent scores from the web-based corpus (provided by module 111), the ranker 108 may also receive and use query-independent scores from a non-web based corpus (provided by module 110, using search results from, e.g., queries in the raw music database 104) associated with the track search query 124.

At 408, the search results 130 may be ranked based on the final ranking scores 126, . . . , 128 of the search results (e.g., documents D1, . . . , Dn) generated by the search engine 102. At 410, the ranked search results may be displayed to the user 101.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for retrieving information.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for retrieving information, comprising:
receiving a search query within a first information corpus that comprises a first plurality of documents, wherein the first information corpus is a first non World Wide Web-based corpus whose first plurality of documents are not available on the World Wide Web;
identifying search results for the search query;
generating a score for each of a plurality of data items identified in the search results, wherein the score for a corresponding one of the plurality of data items is based on:
a score dependent on the search query within the first information corpus; and
at least one score independent of the search query, the at least one score independent of the search query comprising a ranking signal and at least one additional score, the ranking signal being associated with a search of the corresponding one of the plurality of data items using a second information corpus that comprises a second plurality of documents, wherein the second information corpus is a World Wide Web-based corpus whose second plurality of documents are available on an Internet, wherein the first information corpus comprising the first plurality of documents and the second information corpus comprising the second plurality of documents are non-overlapping, the ranking signal including a first score signal based on a number of times the search has been performed over a given period of time, the at least one additional score based on information from a second non World Wide Web-based corpus that includes a geographic location from where the search query originated and whose information is not available on the World Wide Web; and
ranking the search results based on the generated score for each of the plurality of data items.

2. The method according to claim 1, wherein the first information corpus comprises one of:
a music search engine for searching one or more of a music track, a music album, or a music artist;
a movie search engine for searching movies; or
a book search engine for searching books.

3. The method according to claim 1, wherein the first score signal is further based on the number of times the search has been performed.

4. The method according to claim 3, wherein the ranking signal further comprises a second score signal based on at least one popularity metric for at least one web page search result of the search.

5. The method according to claim 4, wherein the at least one popularity metric comprises at least one of query-to-click ratio information or click-through ratio (CTR) information for the at least one web page search result.

6. The method according to claim 4, comprising:
weighting the second score signal, if one or both of:
the at least one web page search result comprises one or more music-related terms; or
the at least one web page search result comprises a music-related web page.

7. The method according to claim 4, wherein the ranking signal comprises an average of the first score signal and the second score signal.

8. The method according to claim 1, wherein the at least one additional score independent of the search query is further based on one or more of:
a sell count of the corresponding one of the plurality of data items;
a release date of the corresponding one of the plurality of data items; or
if the corresponding one of the plurality of data items is a media item, a play count of the corresponding one of the plurality of data items.

9. A system for retrieving information, comprising:
a network device comprising at least one processor coupled to memory, the network device operable to:
receive a search query within a first information corpus that comprises a first plurality of documents, wherein the first information corpus is a first non World Wide Web-based corpus whose first plurality of documents are not available on the World Wide Web;
identify search results for the search query;
generate a score for each of a plurality of data items identified in the search results, wherein the score for a corresponding one of the plurality of data items is based on:
a score dependent on the search query within the first information corpus; and
at least one score independent of the search query, the at least one score independent of the search query comprising a ranking signal and at least one additional score, the ranking signal being associated with a search of the corresponding one of the plurality of data items using a second information corpus that comprises a second plurality of documents, wherein the second information corpus is a World Wide Web-based corpus whose second plurality of documents are available on an Internet, wherein the first information corpus comprising the first plurality of documents and the second information corpus comprising the second plurality of documents are non-overlapping, the ranking signal including a first score signal based on a number of times the search has been performed over a given period of time, the at least one additional score based on information from a second non World Wide Web-based corpus that includes a geographic location from where the search query originated and whose information is not available on the World Wide Web; and
rank the search results based on the generated score for each of the plurality of data items.

10. The system according to claim 9, wherein the first information corpus comprises one of:
a music search engine for searching one or more of a music track, a music album, or a music artist;
a movie search engine for searching movies; or
a book search engine for searching books.

11. The system according to claim 9, wherein the first score signal is further based on the number of times the search has been performed.

12. The system according to claim 11, wherein the ranking signal further comprises a second score signal based on at least one popularity metric for at least one web page search result of the search.

13. The system according to claim 12, wherein the at least one popularity metric comprises at least one of query-to-click ratio information or click-through ratio (CTR) information for the at least one web page search result.

14. The system according to claim 12, wherein the network device is further operable to:
weigh the second score signal, if one or both of:
the at least one web page search result comprises one or more music-related terms; or
the at least one web page search result comprises a music-related web page.

15. The system according to claim 12, wherein the ranking signal comprises an average of the first score signal and the second score signal.

16. The system according to claim 9, wherein the at least one additional score independent of the search query is further based on one or more of:
a sell count of the corresponding one of the plurality of data items;
a release date of the corresponding one of the plurality of data items; or
if the corresponding one of the plurality of data items is a media item, a play count of the corresponding one of the plurality of data items.

17. The system according to claim 9, wherein:
the first information corpus comprises a raw music database storing artist data, album data, and track data;
the score dependent on the search query within the first information corpus indicates a degree to which a corresponding data item in the music database satisfies the search query, the corresponding data item comprising one or more of artist data, album data, or track data; and
the second information corpus comprises music-related documents available on the Internet.

18. A non-transitory, machine-readable storage medium, having stored thereon a computer program having at least one code section for retrieving information, the at least one code section executable by a machine for causing the machine to perform a method comprising:
receiving a search query within a first information corpus that comprises a first plurality of documents, wherein the first information corpus is a first non World Wide Web-based corpus whose first plurality of documents are not available on the World Wide Web;
identifying search results for the search query;
generating a score for each of a plurality of data items identified in the search results, wherein the score for a corresponding one of the plurality of data items is based on:
a score dependent on the search query within the first information corpus; and at least one score independent of the search query, the at least one score independent of the search query comprising a ranking signal and at least one additional score, the ranking signal being associated with a search of the corresponding one of the plurality of data items using a second information corpus that comprises a second plurality of documents, wherein the second information corpus is a World Wide Web-based corpus whose second plurality of documents are available on an Internet, wherein the first information corpus comprising the first plurality of documents and the second information corpus comprising the second plurality of documents are non-overlapping, the ranking signal including a first score signal based on a number of times the search has been performed over a given period of time, the at least one additional score based on information from a second non World Wide Web-based corpus that includes a geographic location from where the search query originated and whose information is not available on the World Wide Web; and
ranking the search results based on the generated score for each of the plurality of data items.

* * * * *